United States Patent
Yang

(10) Patent No.: US 12,520,817 B2
(45) Date of Patent: Jan. 13, 2026

(54) DOUBLE-LAYER PET BOWL

(71) Applicant: Chongjue Yang, Huanghua (CN)

(72) Inventor: Chongjue Yang, Huanghua (CN)

(*) Notice: Subject to any disclaimer, the term of this patent is extended or adjusted under 35 U.S.C. 154(b) by 0 days.

(21) Appl. No.: 18/917,966

(22) Filed: Oct. 16, 2024

(65) Prior Publication Data

US 2025/0089675 A1 Mar. 20, 2025

(30) Foreign Application Priority Data

Mar. 7, 2024 (CN) .......................... 202420440034.1

(51) Int. Cl.
*A01K 5/01* (2006.01)
(52) U.S. Cl.
CPC .................................. *A01K 5/0135* (2013.01)
(58) Field of Classification Search
CPC .. A01K 5/0114; A01K 5/0128; A01K 5/0135; A01K 5/0142
See application file for complete search history.

(56) References Cited

U.S. PATENT DOCUMENTS

| | | | |
|---|---|---|---|
| 3,651,787 A * | 3/1972 | Cooper | A01K 5/0114 119/61.5 |
| 5,323,733 A * | 6/1994 | Youngs-McVicker | A01K 39/014 119/61.5 |
| D410,780 S * | 6/1999 | McGinty | D30/129 |
| 6,948,435 B1 * | 9/2005 | Sheng | A47B 47/0016 108/190 |
| D985,856 S * | 5/2023 | Luo | D30/121 |
| 2008/0190372 A1* | 8/2008 | Horvath | A01K 5/0114 119/61.5 |
| 2016/0242385 A1* | 8/2016 | Parness | F16M 11/38 |
| 2018/0352782 A1* | 12/2018 | Miller | A01K 5/0114 |
| 2023/0189754 A1* | 6/2023 | Stone | A01K 5/0114 119/61.57 |

* cited by examiner

*Primary Examiner* — Ebony E Evans
(74) *Attorney, Agent, or Firm* — Daniel M. Cohn; Howard M. Cohn

(57) ABSTRACT

A double-layer pet bowl including a bowl rack and a base plate. The bowl rack is arranged above the base plate. A splash proof wall structure is provided by protruding from the edge of the surface of the bowl rack, and the surface of the bowl rack is provided with holes for placing pet bowls. A partition structure is provided between the holes, and both ends of the partition structure are respectively coupled to the splash proof wall structure. The splash proof wall structure effectively prevents food and water from splashing out from the bowl body when pets eat, effectively collects the food and water.

1 Claim, 6 Drawing Sheets

DOUBLE-LAYER PET BOWL

TECHNICAL FIELD

The present disclosure belongs to the technical field of pet products, and specifically relates to a double-layer pet bowl.

BACKGROUND

With the improvement of people's living standards, more and more people begin to keep pets, such as cats, dogs, etc., and these pets need to use pet bowls when eating or drinking.

At present, people often have the following problems when raising pets: pets tend to splash food and water on the ground when eat or drink with pet bowls, causing the floors or furniture surfaces to become damp and requiring a second cleaning. However, most pet bowls in the market are not equipped with the function of preventing food from splashing out, it is thus necessary to design a simple pet bowl that prevents food and water from splashing out.

SUMMARY

In order to solve the above problems, the present disclosure provides a double-layer pet bowl. The splash proof wall structure of the bowl rack portion effectively prevents food and water from splashing out. At the same time, the partition structure in the middle of the bowl rack portion effectively separates the food and water splashed out.

In order to realize the above purpose, the present disclosure adopts the following technical scheme: a double-layer pet bowl, including a bowl rack and a base plate, wherein the bowl rack is arranged above the base plate, wherein a spray proof wall structure is provided by protruding from the edge of the surface of the bowl rack, the surface of the bowl rack is provided with holes for placing pct bowls, a partition structure is provided between the holes, and both ends of the partition structure are respectively coupled to the splash proof wall structure.

Further, the base plate is a licking plate, a licking tank is provided on a surface of the licking plate, a plurality of friction bars arranged at intervals are provided on the bottom wall of the licking tank, and a plurality of friction particles arranged at intervals are provided inside the licking plate.

Further, each bottom corner of the bowl rack is provided with a first assembling foot clamped on the side wall of the licking tank.

Further, each bottom corner of the licking plate is movably provided with a retractable bracket assembly.

Further, the retractable bracket assembly includes a folding leg provided with a retractable leg inside, wherein a assembling groove is provided in the folding leg, a surface of the folding leg is provided with several retaining holes communicated with the assembling groove, and an elastic button is provided in the retractable leg, wherein the retractable leg is assembled in the assembly groove, and the retractable leg achieves the relative positions of the folding leg and the retractable leg by means of the clastic button fitting in different one of the retaining holes.

Further, each bottom corner of the licking plate is provided with a second assembling foot which is provided with a locating groove, wherein the inner walls of both sides of the locating groove are provided with a first positioning protrusion, and both sides of the folding leg are provided with a rotating groove for fitting the first positioning protrusion.

Further, both sides of the folding leg are further provided with an extension groove communicated with the rotating groove, wherein the inner walls of both sides of the locating groove are provided with a positioning bar located next to the first positioning protrusion, the folding leg may rotate around the rotating groove and are stored at the bottom of the licking plate, and the positioning bar may be buckled in the extension groove to achieve positioning.

Further, both sides of the end of the locating groove are provided with a second retaining bump, and both sides of the top portion of the folding leg are provided with a first retaining notch communicated with the rotating groove, wherein the folding leg may move toward the end of the locating groove such that the second retaining bump is set in the first retaining notch, the first positioning protrusion is located in the extension groove, and the positioning bar fits on the side of the folding leg to achieve positioning.

Further, the height of the splash proof wall structure on the front side of the bowl rack is lower than the height of the splash proof wall structure on the rear side, the left side, and the right side of the bowl rack.

The present disclosure has the following prominent technical effects:

1. The splash proof wall structure of the bowl rack effectively prevents food and water from splashing out. The function of this part is mainly realized by the splash proof wall structure coming with the bowl rack. This splash proof wall structure raised from the edge of the horizontal surface of the bowl rack effectively prevents the food and water from being splashed out from the bowl to the surroundings when a pet eats, and effectively collects the food and water without spilling onto the ground.

2. The partition structure in the middle of the bowl rack effectively separates the food and water splashed out. The function of this part is mainly realized by the partition structure coming with the middle part of the bowl rack. During the use of this product, the user may hold food in the left bowl and store water in the right bowl, and this sheet partition structure may separate the food and water collected by the partition structure without mixing together, making it easier to clean. This sheet partition structure may also effectively prevent the food in the left bowl from splashing out to the right bowl, and/or prevent the water in the right bowl from splashing out to the left bowl when pets eat.

3. When pets eat, either the bowl rack located above may be used or the licking plate located on the second floor may be used alone. The function of this part is mainly realized by the superimposed bowl rack and licking plate. When using this product, the user may remove the upper bowl rack and only use the lower licking plate alone.

4. The retractable bracket assembly may realize folding and retracting. The folding leg may be fully folded or unfolded, and the retractable leg may change the relative position between the retractable leg and folding leg with the elastic button, thus changing the eating height of the entire product.

Figure 1:
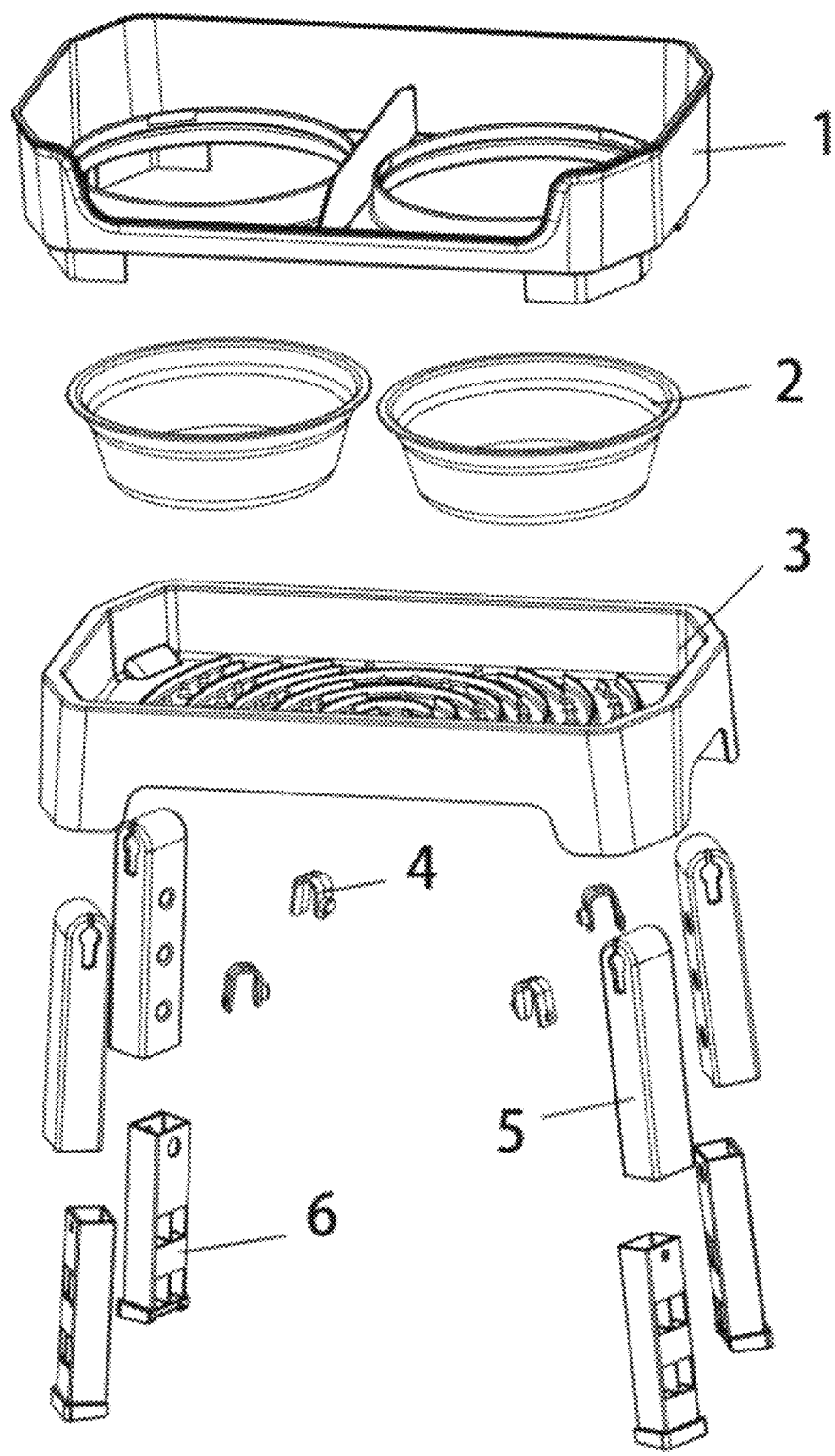
FIG. 1 is a structural schematic diagram of the explosion decomposition of the overall structure of the present disclosure.

The meaning of reference numerical in the drawings: 1. bowl rack; 2. pet bowl; 3. licking plate; 4. elastic button; 5. folding leg; 6. retractable leg; 7. partition structure; 8. friction bar; 10. friction particle; 11. splash proof wall structure; 12. hole; 13. first assembling foot; 31. locating groove; 32. first positioning protrusion; 33. positioning bar; 34. second retaining bump; 35. second assembling foot; 51. retaining hole; 52. assembly groove; 531. rotating groove; 532. extension groove; and 533. first retaining notch.

DETAILED DESCRIPTION

Figure 2:
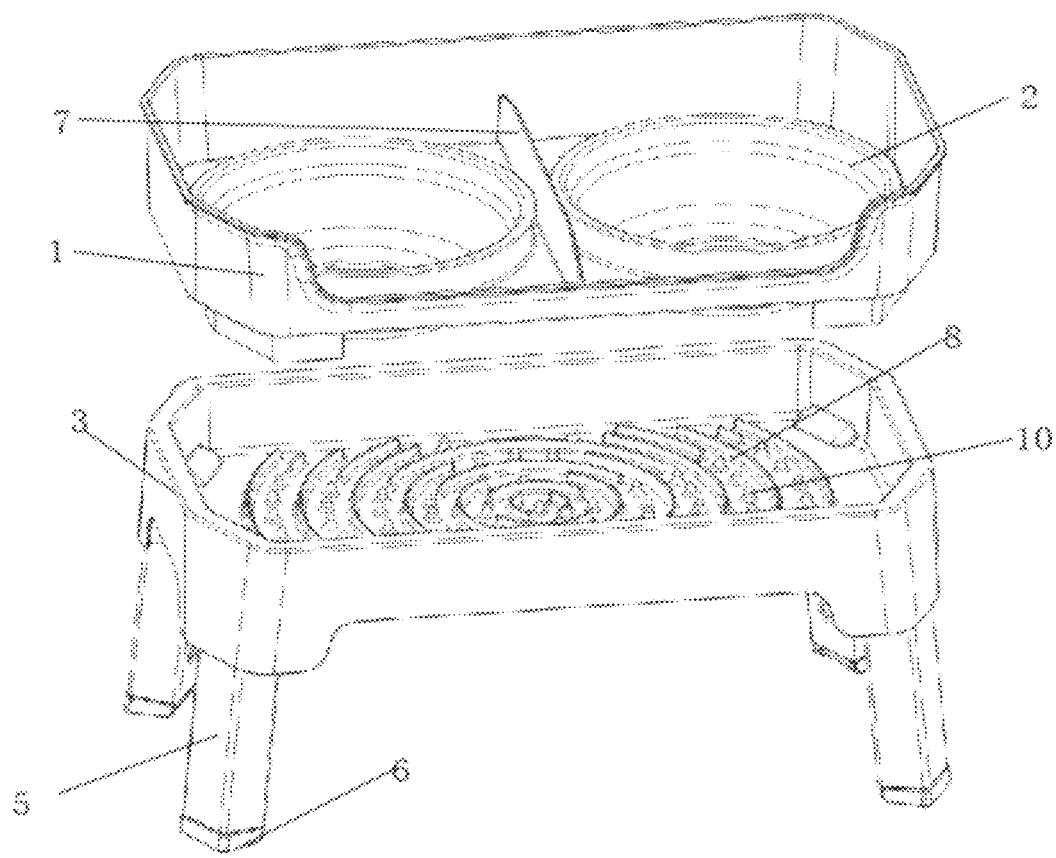
FIG. 2 is a partial structural schematic diagram of the interior of the licking plate of the present disclosure.
Figure 3:
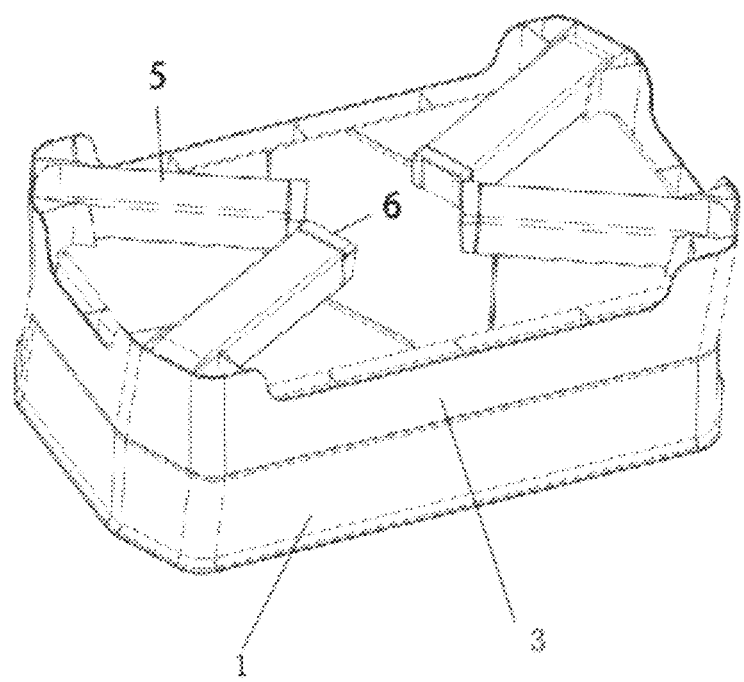
FIG. 3 is a structural schematic diagram of the overall bottom structure the present disclosure.
Figure 4:
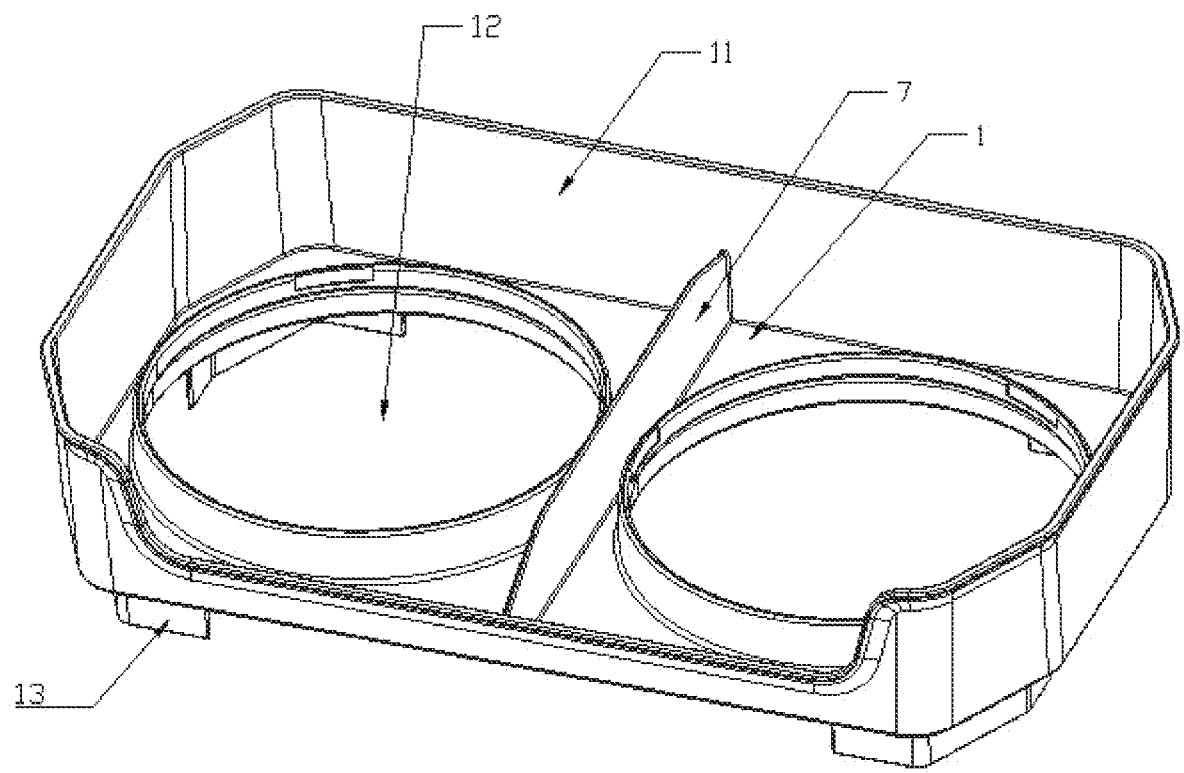
FIG. 4 is a partial structural schematic diagram of the bottom of the licking plate of the present disclosure.
Figure 5:
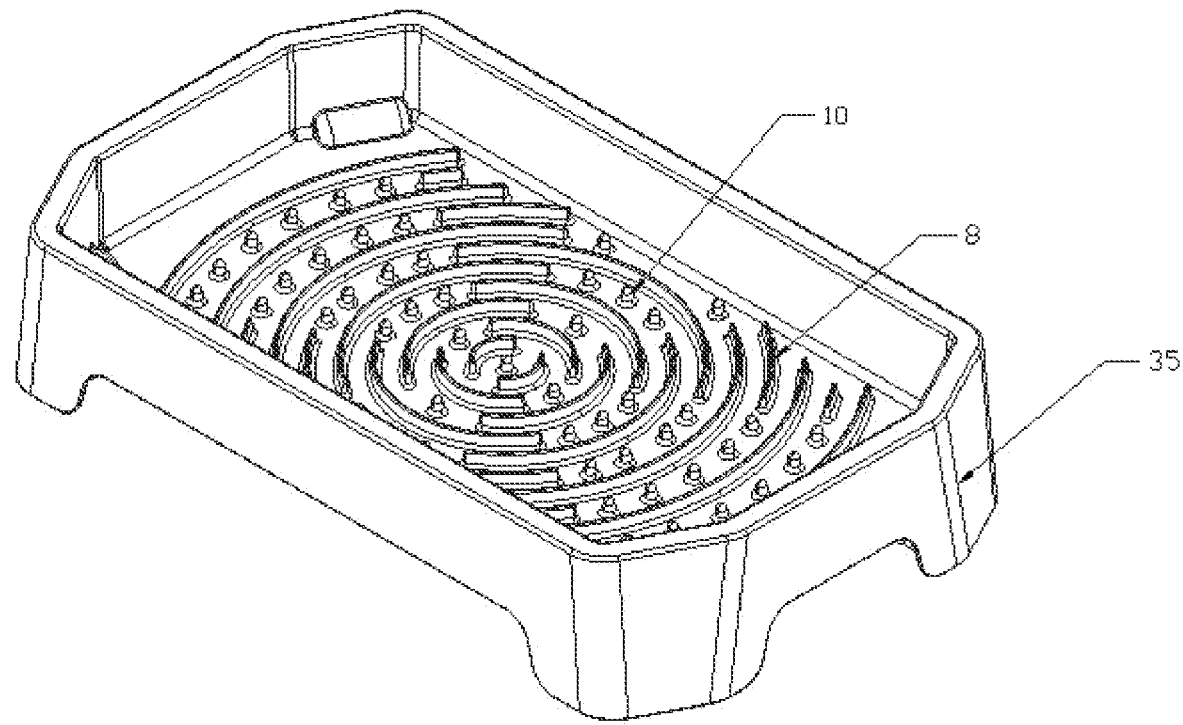
FIG. 5 is a schematic diagram of the licking plate structure of the present disclosure.
Figure 6:
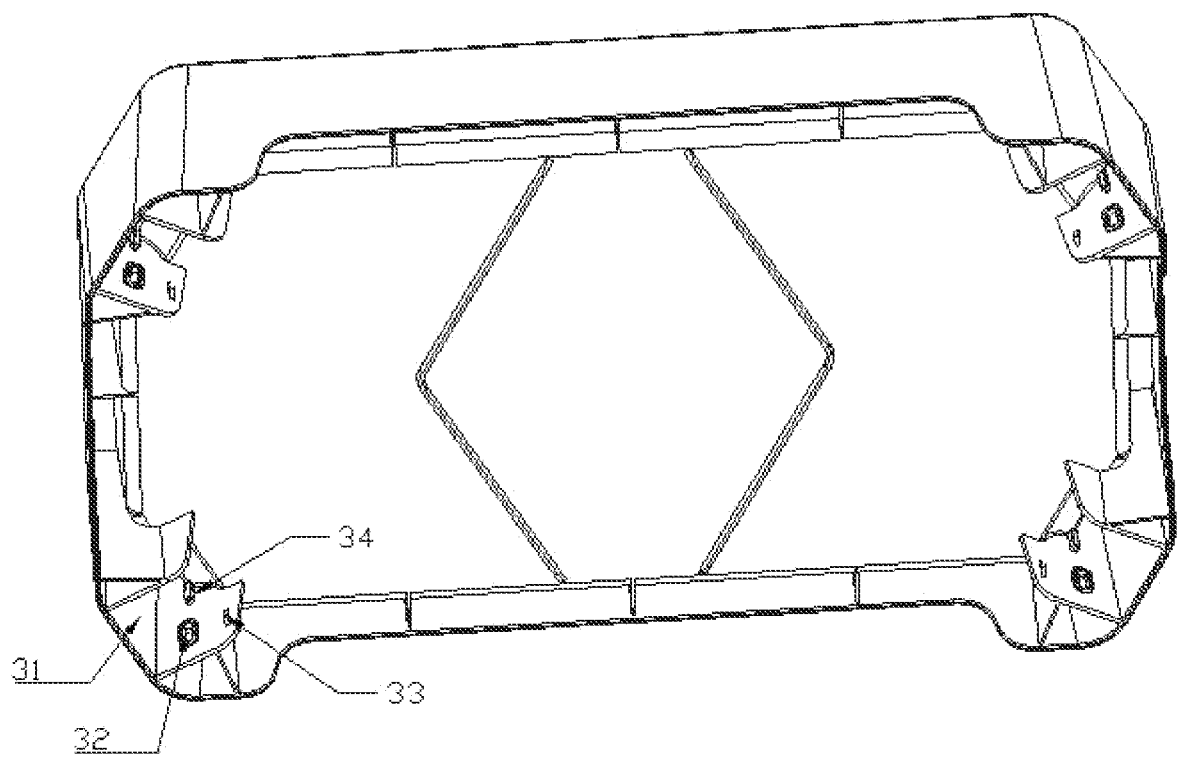
FIG. 6 is a schematic diagram of the bottom structure of the licking plate.
Figure 7:
FIG. 7 is a schematic diagram of the structure of the folding leg of the present disclosure.
Figure 8:
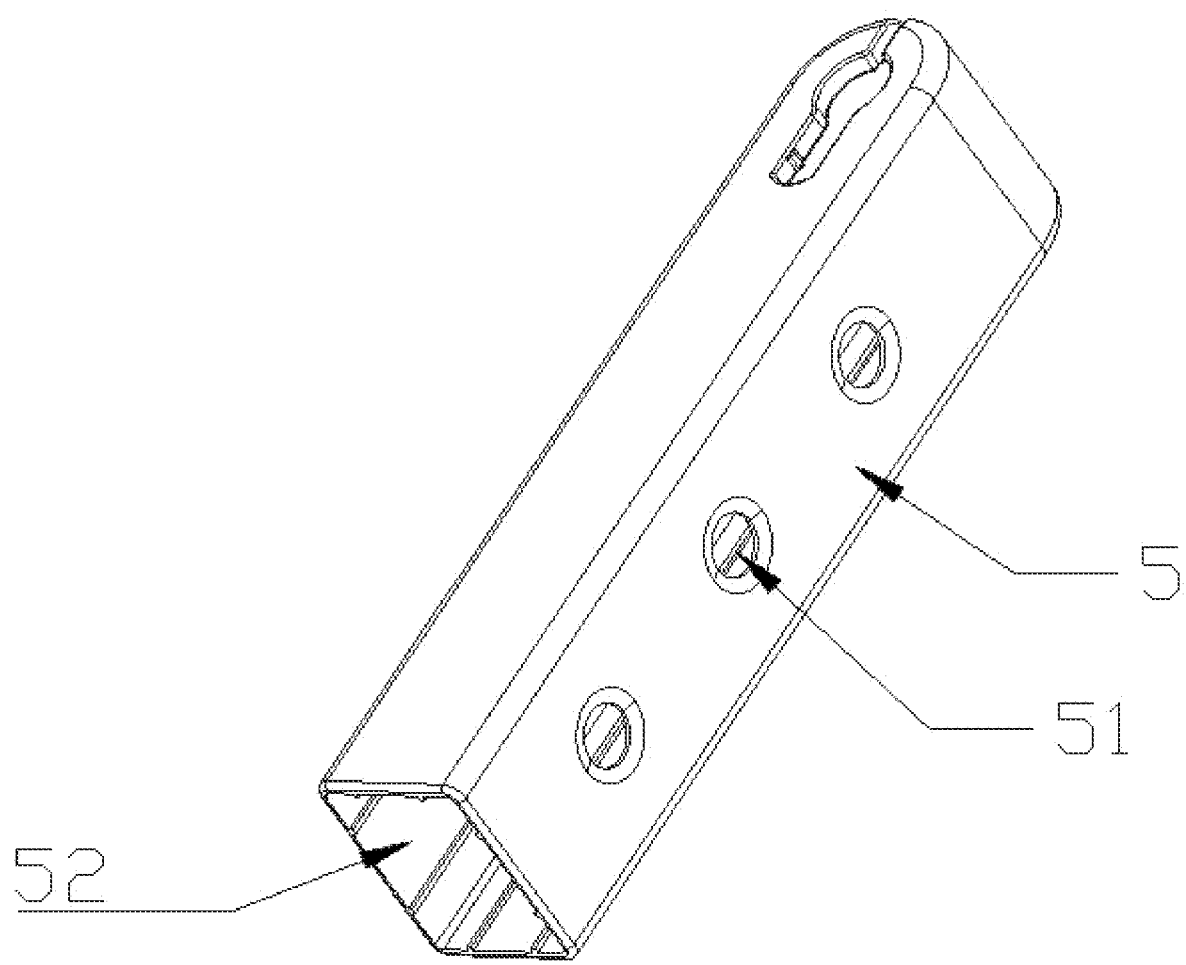
FIG. 8 is a schematic view of the folding leg of the disclosure.
Figure 9:
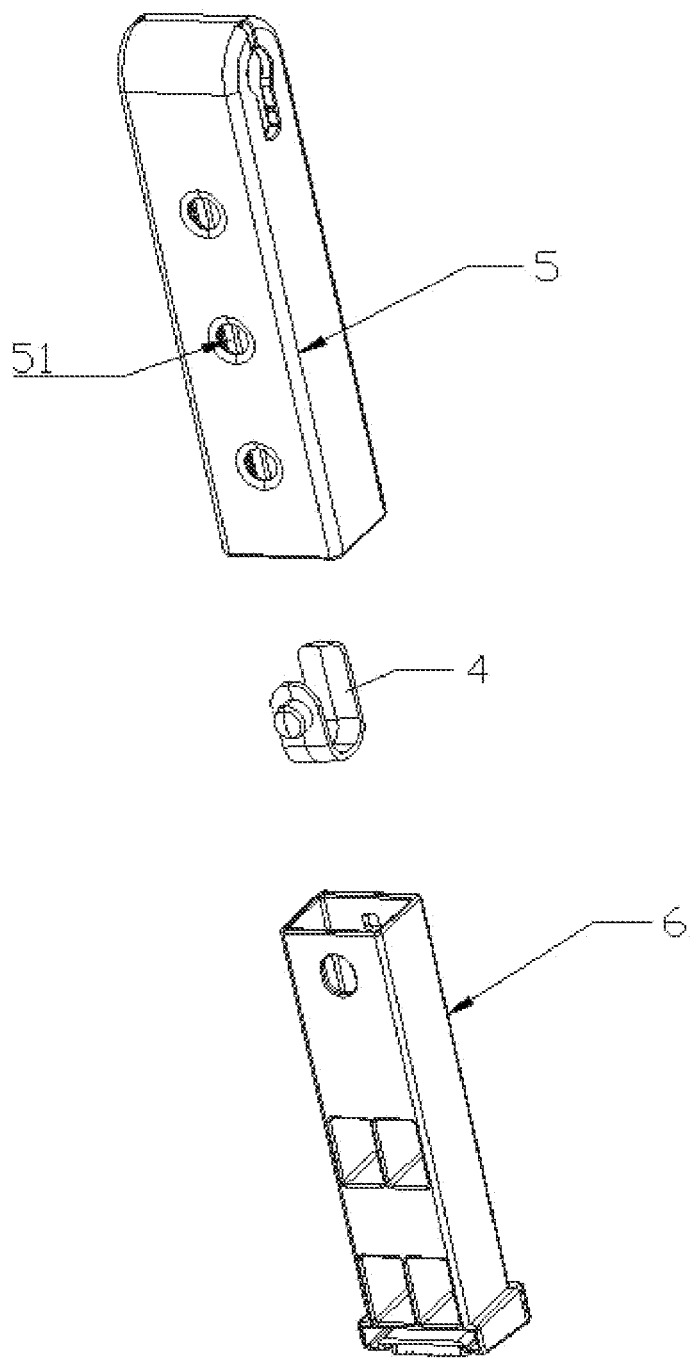
FIG. 9 is a schematic diagram of the explosive decomposition structure of the expansion bracket assembly of the present disclosure.

Referring to FIGS. 1-9, the present disclosure relates to a double-layer pet bowl including a bowl rack 1 and a base plate, wherein the bowl rack 1 is provided above the base plate, a splash proof wall structure 11 is provided by protruding from the edge of the surface of the bowl rack 1. The surface of the bowl rack 1 is provided with holes 12 for placing pet bowls 2, a partition structure 7 is provided between the holes 12, and both ends of the partition structure 7 are respectively coupled to the splash proof wall structure 11.

The splash proof wall structure 11 of the bowl rack 1 effectively prevents food and water from splashing out. The function of this part is mainly realized by the splash proof wall structure 11 coming with the bowl rack 1. This splash proof wall structure 11 raised from the edge of the horizontal surface of the bowl rack 1 effectively prevents the food and water from being splashed out from the bowls to the surroundings when pets eat, and effectively collects the food and water, without spilling onto the ground.

The partition structure 7 in the middle of the bowl rack 1 effectively separates the food and water splashed out. The function of this part is mainly realized by the partition structure 7 in the middle part of the bowl rack 1. During the use of this product, the user may hold food in the left bowl and store water in the right bowl, and this sheet partition structure 7 may separate the food and water collected by the partition structure without mixing together, making it easier to clean. This sheet partition structure 7 may also effectively prevent the food in the left bowl from splashing out to the right bowl, and/or prevent the water in the right bowl from splashing out to the left bowl when pets eat.

Further, the base plate is a licking plate 3, a licking tank is provided on a surface of the licking plate, a plurality of friction bars 8 arranged at intervals are provided on the bottom wall of the licking tank, and a plurality of friction particles 10 arranged at intervals are provided inside the licking plate 3.

The main function of the licking plate 3 is to control the pet's eating speed and prevent indigestion problems that may be caused by eating too quickly, because pets eating too quickly may cause various health problems, including digestive problems, vomiting, etc. Through the design of the licking plate 3, pets may lick food at a slower speed, thereby making better use of the digestive system and reducing the speed of food entering the stomach, which may improve the pet's digestive efficiency and reduce health problems.

Furthermore, each corner of the bottom of the bowl rack 1 is provided with a first assembling foot 13 clamped on the side wall of the licking tank. When a pet eats, either the bowl rack 1 located above may be used or the licking plate 3 located on the second floor may be used alone. The function of this part is mainly realized by the superimposed bowl rack 1 and licking plate 3. When using this product, the user may remove the upper bowl rack 1 and only use the lower licking plate 3 alone. Moreover, the bowl rack 1 may be clamped on the side wall of the licking tank through the first assembling foot 13, so as to realize quick positioning and assembly.

Further, each corner of the bottom of the licking plate 3 is provided with a retractable bracket assembly.

Further, the retractable bracket assembly includes a folding legs 5 provided with a retractable leg 6 inside, wherein an assembly groove 52 is provided in the folding leg 5, a surface of the folding leg 5 is provided with several retaining holes 51 communicated with the assembly groove 52, and an elastic button 4 is provided in the retractable leg 6. The retractable leg 6 is assembled in the assembly groove 52. Further the retractable leg 6 is assembled by the elastic button 4 fitted in different one of retaining holes 51 to achieve the relative positions of the folding leg 5 and the retractable leg 6.

In this embodiment, it is realized through a structure of four foldable folding legs 5 and a structure of four retractable legs 6 which may adjust the length thereof. The folding leg 5 may be fully folded or unfolded, and the retractable leg 6 may change the relative position between the retractable leg 6 and folding leg 5 through the elastic button 4, thus changing the eating height of the entire product. This is great for meeting the needs of pets of different sizes or heights, especially in multi-pet households.

Further, each bottom corner of the licking plate 3 is provided with a second assembling foot 36 which is provided with a locating groove 31, wherein the inner walls of both sides of the locating groove 31 are provided with a first positioning protrusion 32, and both sides of the folding leg 5 are provided with a rotating groove 531 for fitting the first positioning protrusion 32. Both sides of the folding leg 5 are further provided with an extension groove 532 communicated with the rotating groove 531, wherein the inner walls of both sides of the locating groove 31 are provided with a positioning bars 33 located next to the first positioning protrusion 32, the folding leg 5 rotates around the rotating groove 531 and are stored at the bottom of the licking plate 3. Therefore the positioning bar 33 is buckled in the extension groove 532 so as to achieves positioning.

The rotating grooves 531 are provided on both sides of the folding leg 5, and the first positioning protrusions 32 are provided on the inner walls of both sides of the positioning groove 31. Such a design allows the folding leg 5 to rotate around the rotating groove 531 and be stored at the bottom of the licking plate 3. At the same time, the stable positioning of the folding leg 5 is achieved by being assembled with the first positioning protrusion 32. Both sides of the folding leg 5 are further provided with an extension groove 532 communicated with the rotating groove 531, wherein the inner walls of both sides of the positioning groove 31 are provided with the positioning bar 33 located next to the first positioning protrusion 32. Such a design allows the positioning bar 33 being buckled in the extension groove 532 when the folding leg 5 rotates around the rotation groove 531, further ensuring the accurate positioning of the folding leg 5.

Further, both sides of the end of the locating groove 31 are provided with a second retaining bump 34, and both sides of the top portion of the folding leg 5 are provided with a first retaining notch 533 communicated with the rotating groove 531, wherein the folding leg 5 moves toward the end of the locating groove 31 such that the second retaining bump 34 is clamped in the first retaining notch 533, the first positioning protrusion 32 is located in the extension groove 532, and the positioning bar 33 fits on the side of the folding leg 5 to achieve positioning.

Both sides of the end of the locating groove 31 are provided with a second retaining bump 34, and both sides of the top portion of the folding leg 5 are provided with a first retaining notch 533 communicated with the rotating groove 531. Such a design allows the second retaining bump 34 to be clamped in the first retaining notch 533 when the folding leg 5 moves to the end of the locating groove 31, thereby enhancing the stability and firmness of the folding leg 5. The first positioning protrusion 32 is located in the extension groove 532, and the positioning bar 33 is attached to the side of the folding leg 5, so both of them realize the accurate positioning of the folding leg 5 and ensure the stability of the folding leg 5 when moving and standing.

Further, the height of the splash proof wall structure 11 on the front side of the bowl rack 1 is lower than the height of the splash proof wall structure 11 on the rear side, the left side, and the right side of the bowl rack 1. Because the splash proof wall structure 11 on the front side of the bowl rack 1 is relatively low, it is easier for pets to access the front side of the bowl, and the obstruction of the pet's sight by the splash proof wall is reduced. This helps improve comfort level for pets while eating. Pets prefer to approach food from the front when eating. Such a design can adapt to the pet's natural eating posture, making it easier for them to lick the food in the bowl.

The operation principle and usage of the present disclosure are as follows: the splash proof wall structure 11 around the bowl rack 1 effectively prevents food and water from splashing out. The function of this part is mainly realized by the splash proof wall structure 11 coming with the bowl rack 1. This four-sided splash proof wall structure 11 raised from the four edges of the horizontal surface of the bowl rack 1 effectively prevents the food and water from being splashed out from the bowl to the surroundings when a pet eats, and effectively collects the food and water, without spilling onto the ground. By means of a structure of four foldable folding legs 5 and a structure of four retractable legs 6 which can adjust the length thereof, the folding leg 5 may be fully folded or unfolded, and the retractable leg 6 may change the relative position between the retractable leg 6 and folding leg 5 through the elastic button 4, thus changing the eating height of the entire product. when a pet eats, either the bowl rack 1 located above may be used or the licking plate 3 located on the second floor may be used alone, the function of this part is mainly realized by the superimposed bowl rack 1 and licking plate 3. The user may remove the upper bowl rack 1 and only use the lower licking plate 3 alone.

The embodiments above are only preferred embodiments of the present disclosure, and are not intended to limit the scope of the present disclosure. Various variations and improvements of the technical solution of the present disclosure made by a person of ordinary skill in the art without departing from the design spirit of the present disclosure shall fall into the protection scope determined by claims of the present disclosure.

The invention claimed is:

1. A double-layer pet bowl, comprising:
a base plate;
a bowl rack disposed above the base plate;
a splash proof wall structure protruding from an edge of the bowl rack;
a plurality of holes disposed in the bowl rack; and
a partition structure disposed between the holes and having two ends coupled to the splash proof wall structure respectively;
wherein each bottom corner of the bowl rack is provided with a first assembling foot;
wherein each bottom corner of the base plate is movably provided with a retractable bracket assembly including a folding leg, the folding leg being provided with a retractable leg therein;
wherein an assembly groove is disposed in the folding leg, a surface of the folding leg is provided with a plurality of retaining holes communicating with the assembly groove, and an elastic button is disposed in the retractable leg;
wherein the retractable leg is disposed in the assembly groove;
wherein each bottom corner of the base plate is further provided with a second assembling foot, the second assembling foot being provided with a locating groove;
wherein inner walls of both sides of the locating groove are provided with a first positioning protrusion, and both sides of the folding leg are provided with a rotating groove with the first positioning protrusion disposed therein;
wherein both sides of the folding leg are further provided with an extension groove communicating with the rotating groove;
wherein the inner walls of both sides of the locating groove are further provided with a plurality of positioning bars proximate the first positioning protrusion;
wherein the folding leg is rotatable about the rotating groove and disposed at a bottom of the base plate;
wherein the positioning bar is disposed in the extension groove;
wherein both sides of an end of the locating groove are provided with a second retaining bump; and
wherein both sides of a top of the folding leg are provided with a first retaining notch communicating with the rotating groove.

* * * * *